Nov. 29, 1955
W. F. BORN ET AL
2,725,542
BUS DUCT STRUCTURE AND PLUG-IN
UNIT HAVING POLARIZING MEANS
Filed July 20, 1953
2 Sheets-Sheet 1
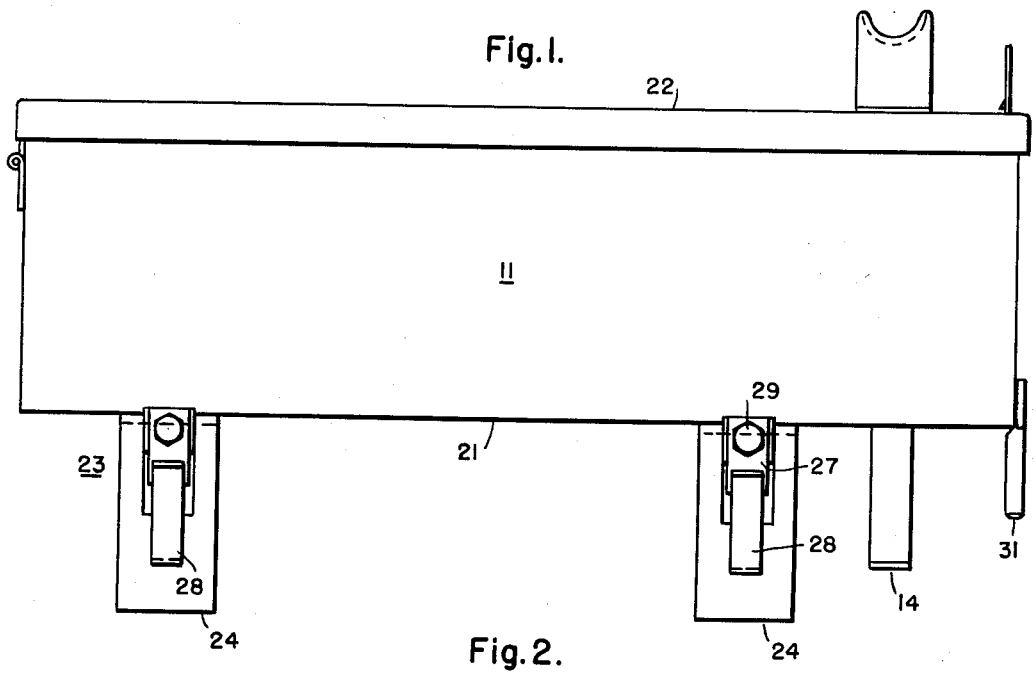
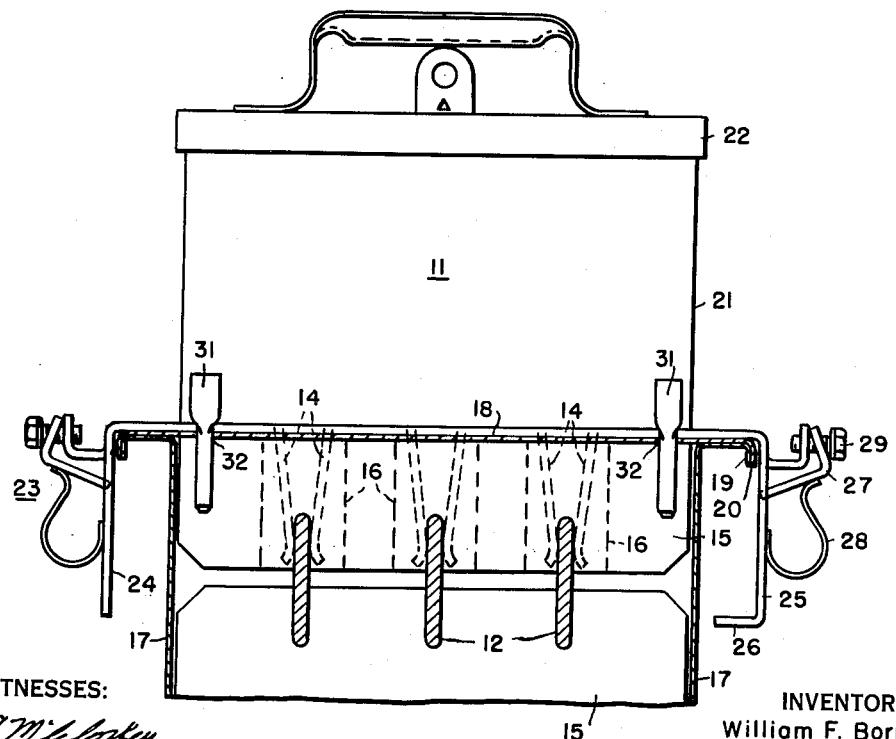
WITNESSES:
INVENTORS
William F. Born
and James B. Wallace.
BY
ATTORNEY

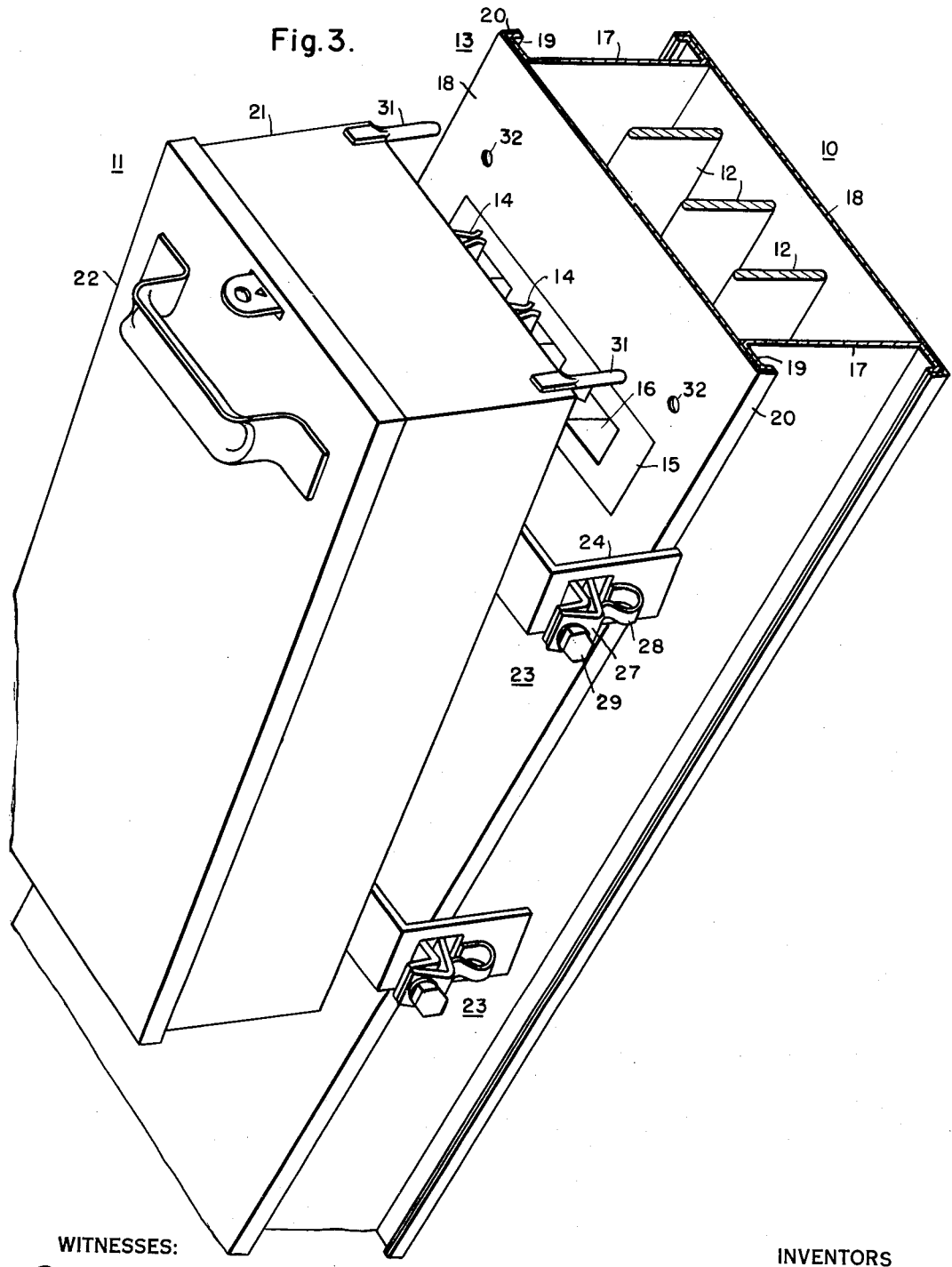

United States Patent Office 2,725,542
Patented Nov. 29, 1955

2,725,542

BUS DUCT STRUCTURE AND PLUG-IN UNIT HAVING POLARIZING MEANS

William F. Born and James B. Wallace, Beaver, Pa., assignors to Westinghouse Electric Corporation, East Pittsburgh, Pa., a corporation of Pennsylvania Application July 20, 1953, Serial No. 368,967

2 Claims. (Cl. 339—22)

Our invention relates, generally, to bus ducts for electrical distribution systems and, more particularly, to bus duct of the plug-in type in which plug-in or power take-off units are removably attached to the duct housing.

Since the plug-in units for bus duct are often utilized to connect electric motors to the bus bars within the duct housing, it is frequently desirable to polarize the plug-in units to prevent reversing the polarity of the motor connections by removing and reinstalling a plug-in unit. One method of polarization is to so offset the stab connectors on the plug-in unit and the openings in the duct housing for the stabs that the unit must be installed with each stab connected to a certain bus bar. This prior method has the disadvantage of preventing the installation of a plug-in unit on duct which is not made with the polarizing feature. Also, it is sometimes desirable to be able to reverse the rotation of a motor by merely changing the plug-in unit end-for-end on the duct housing. This cannot be done if the stabs are offset in the foregoing manner.

An object of our invention is to provide a simple and effective means for polarizing plug-in units for bus duct.

Another object of our invention is to provide a plug-in unit for bus duct which may be readily converted from a polarized unit to a non-polarized unit.

Other objects of our invention will be explained fully hereinafter or will be apparent to those skilled in the art.

In accordance with one embodiment of our invention, pins are so attached to a plug-in unit that they will enter matching holes in the duct housing only when the plug-in unit is installed on the housing one way, thereby insuring that each one of the stab connectors will always engage the same phase bar in the duct housing. The pins may be removed if it is desired to install the plug-in unit on a duct housing which does not have the polarizing feature or if it is desired to reverse the phase connections by turning the plug-in unit end-for-end.

For a better understanding of the nature and objects of the invention, reference may be had to the following detailed description, taken in conjunction with the accompanying drawing, in which:

Figure 1 is a view, in side elevation, of a bus duct plug-in unit embodying the principal features of the invention;

Fig. 2 is a view, partly in end elevation and partly in section, showing the plug-in unit installed on a bus duct housing; and Fig. 3 is a view, in perspective, illustrating the manner of installing the plug-in unit on the duct housing.

Referring to the drawings, and particularly to Fig. 3, the structure shown therein comprises a bus duct 10 and a plug-in unit 11 which is disposed on one side of the bus duct 10. The bus duct 10 is of the plug-in type having a plurality of bus bars 12 which are so disposed within a metal housing 13 that they may be engaged by contact members or stab connectors 14 which extend from the bottom of the plug-in unit 11. The bus bars 12 are supported by suitable insulators 15 which are located at regular intervals along the bus duct.

In the present structure, the insulators 15 are provided with openings 16 for receiving the stab connectors 14. It should be noted that the stabs 14 and openings 16 are in a line extending transversely of the length of the duct run and are symmetrically placed relative to the center line of the duct run. However, in some structures the stab connectors merely extend through openings provided in the bus duct housing and the insulators which support the bus bars are not necessarily located at the openings in the bus duct housing through which the stab connectors extend.

As shown, the bus duct housing 13 comprises generally channel shaped walls 17 and side walls 18. The walls 17 have inwardly extending flanges 19, which are overlapped by flanges 20 on the side walls 18. As previously stated, the side walls 18 are provided with openings for the insulators 15.

The plug-in unit 11 comprises a metal casing 21 having a removable or openable cover 22. A circuit interrupter unit, which may be either an automatic circuit breaker or a manually operable switch, is mounted inside the casing 21 and is electrically connected to the stab connectors 14, thereby connecting the interrupter unit to the bus bars 12 when the plug-in unit 11 is properly installed on the bus duct housing 13.

It will be understood that power conductors (not shown) may be connected to terminals on the interrupter unit inside the casing 21 to supply power for operating electric apparatus, such as electric motors. In this manner, the plug-in units may be located at the most advantageous positions along the bus duct for supplying power to the various machines or other apparatus in a factory. It will also be understood that it is usually essential that a plug-in unit always be installed on the bus duct housing in the same manner in order that each stab connector will always engage the same phase bus bar in order to insure the correct rotation of an electric motor supplied with power through the plug-in unit.

The plug-in unit 11 may be retained in position on the bus duct housing 13 by means of clamping devices 23 which may be of the type described and claimed in the copending application of W. F. Born and J. Zipay, Serial No. 239,242, filed July 30, 1951. Briefly, each clamping device 23 comprises a generally U-shaped member secured to the bottom of the plug-in unit and having legs 24 and 25 which function as guides when the plug-in unit is being installed on the bus duct housing. One leg 25 is bent to form a hook 26 for hanging the unit on the housing prior to its installation. A clamp 27 is attached to each leg by a spring 28 which biases the clamp to its open position until a screw 29 is turned to draw the clamp to a position in which it engages the flanges 19 and 20 on the housing 13, thereby holding the plug-in unit in its operating position on the duct housing.

As previously explained, it is desirable to provide a means for polarizing the plug-in unit in order to insure that each stab connecter 14 will always engage the same bus bar 12. In the present structure, polarization is accomplished by attaching one or more pins 31 to the casing 21 of the plug-in unit 11. A hole 32 is provided in the side plate 18 of the duct housing for each pin 31. The holes 32 are so located that when the pins 31 enter the holes, the stab connectors 14 enter the openings in the side plate 18 to properly engage the bus bars 12. Thus, it is possible to install the plug-in unit 11 on the duct housing 13 in only one way since the pins 31 prevent the installation of the unit improperly. Accordingly, each stab connector 14 will always be connected to the same phase bus bar 12.

As shown most clearly in Fig. 2, the pins 31 are of such length that they enter the holes 32 before the stab connectors 14 touch the bus bars 12. Therefore, the plug-in unit must be in its correct position both laterally and longitudinally with respect to the opening in the housing 13 for the stab connectors.

In this manner the stab connectors are prevented from touching the sides of the opening after they have engaged the bus bars 12, thereby eliminating the possibility of a short circuit being established through the stab connectors and the duct housing. This feature is particularly important in bus duct structures in which insulators are not provided at the openings in the bus duct housing for the stab connectors, or in which no other means is provided for preventing the stab connectors coming in contact with the cover of the duct housing after they have engaged the bus bars.

In the event that it is desired to reverse the phase connections by turning the plug-in unit end-for-end when it is installed on the bus duct housing, the pins 31 may be cut off or otherwise removed from the plug-in unit, thereby permitting the unit to be installed on the housing after it has been turned end-for-end. This is possible because of the symmetrical in-line arrangement of the openings 16 and stabs 14, as previously described, and because the clamping devices 23 may engage either edge of the duct.

Furthermore, if it is desired to install the plug-in unit on a duct housing which does not have the openings 32 for receiving the pins 31, the pins may be easily removed from the plug-in unit to permit its installation. Of course, when this is done, the polarizing feature is no longer retained.

From the foregoing description, it is apparent that we have provided a simple and effective means for polarizing a bus duct plug-in unit when it is installed on a bus duct housing. The polarization of the plug-in unit provides for maintaining the same phase connections to the apparatus supplied with power through the plug-in unit. The present structure also provides for securing the correct positioning of the plug-in unit with respect to the bus duct housing when the plug-in unit is being installed on the duct housing.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a bus duct structure, in combination, an elongated duct housing having three bus bars symmetrically disposed in the housing and extending longitudinally of the housing, an opening in one side of the housing providing access to said bus bars, a generally rectangular plug-in unit housing having three stab connectors for extending therefrom, said stab connectors being symmetrically disposed about axes both transversely and longitudinally of the duct housing when the unit housing is installed on the duct housing with the stab connectors extending through said opening to engage the bus bars, spaced pins attached to the unit housing, correspondingly spaced holes in the duct housing for said pins, said pins being offset longitudinally from the transversely aligned stab connectors, said holes being offset transversely from the longitudinally aligned bus bars, said pins and said holes cooperating with the stab connectors to permit installation of the plug-in unit on the duct housing in only one position with each one of the stab connectors always engaging the same bus bar, said bus bars being insulated from said duct housing, said stab connectors being insulated from said unit housing whereby said pins are insulated from said bus bars and said stab connectors, and said pins being of sufficient length to enter said holes before the stab connectors touch the bus bars.

2. The subject matter set forth in the preceding claim, characterized by the fact that the spaced pins are disposed adjacent to the transversely opposite corners of the plug-in unit housing.

References Cited in the file of this patent

UNITED STATES PATENTS

| | | |
|---|---|---|
| 2,233,067 | Alden | Feb. 25, 1941 |
| 2,251,403 | Frank et al. | Apr. 5, 1941 |
| 2,306,353 | Cole et al. | Dec. 22, 1942 |
| 2,339,600 | Carlson et al. | Jan. 18, 1944 |

FOREIGN PATENTS

| | | |
|---|---|---|
| 675,111 | Great Briatin | July 2, 1952 |